UNITED STATES PATENT OFFICE.

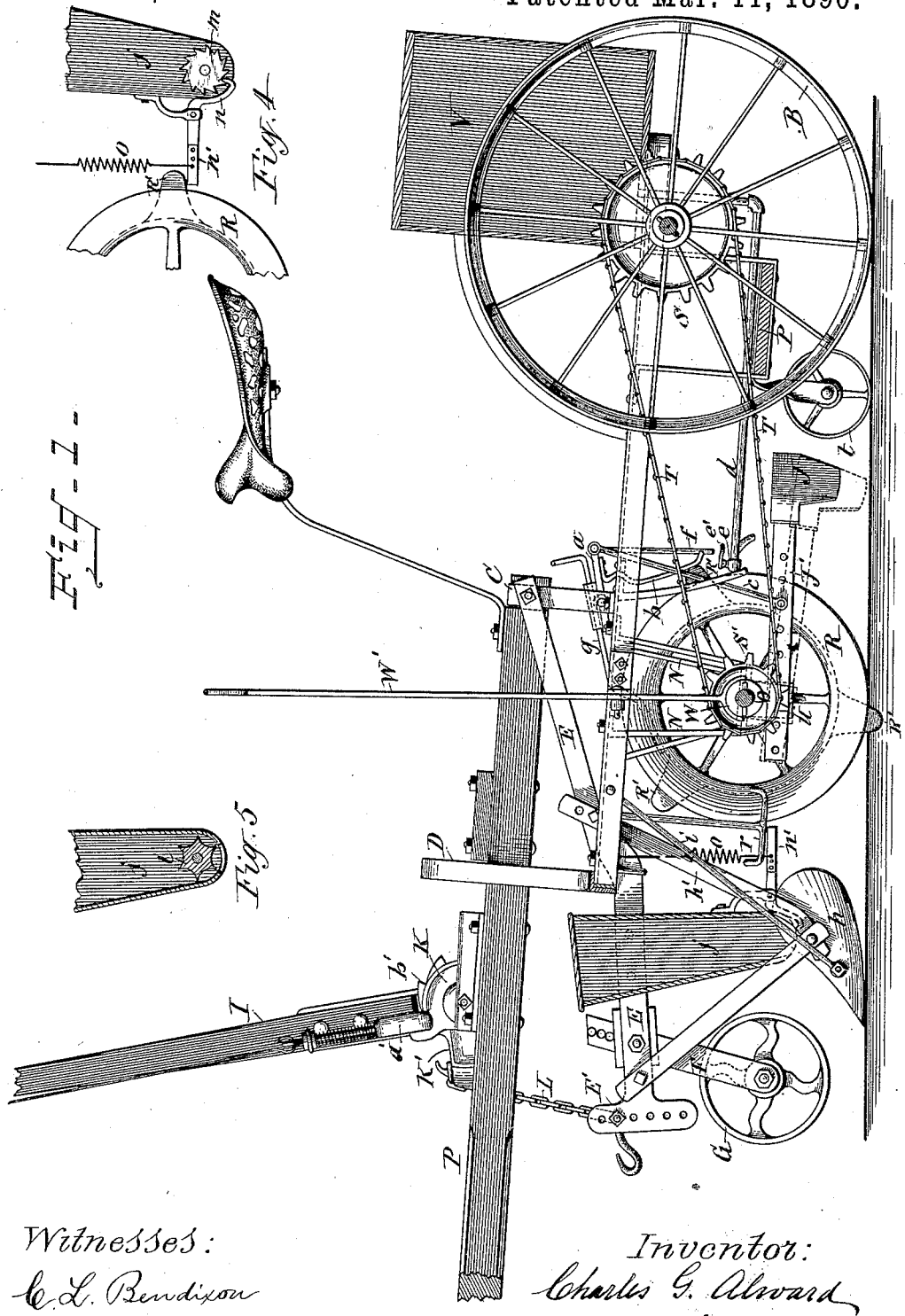

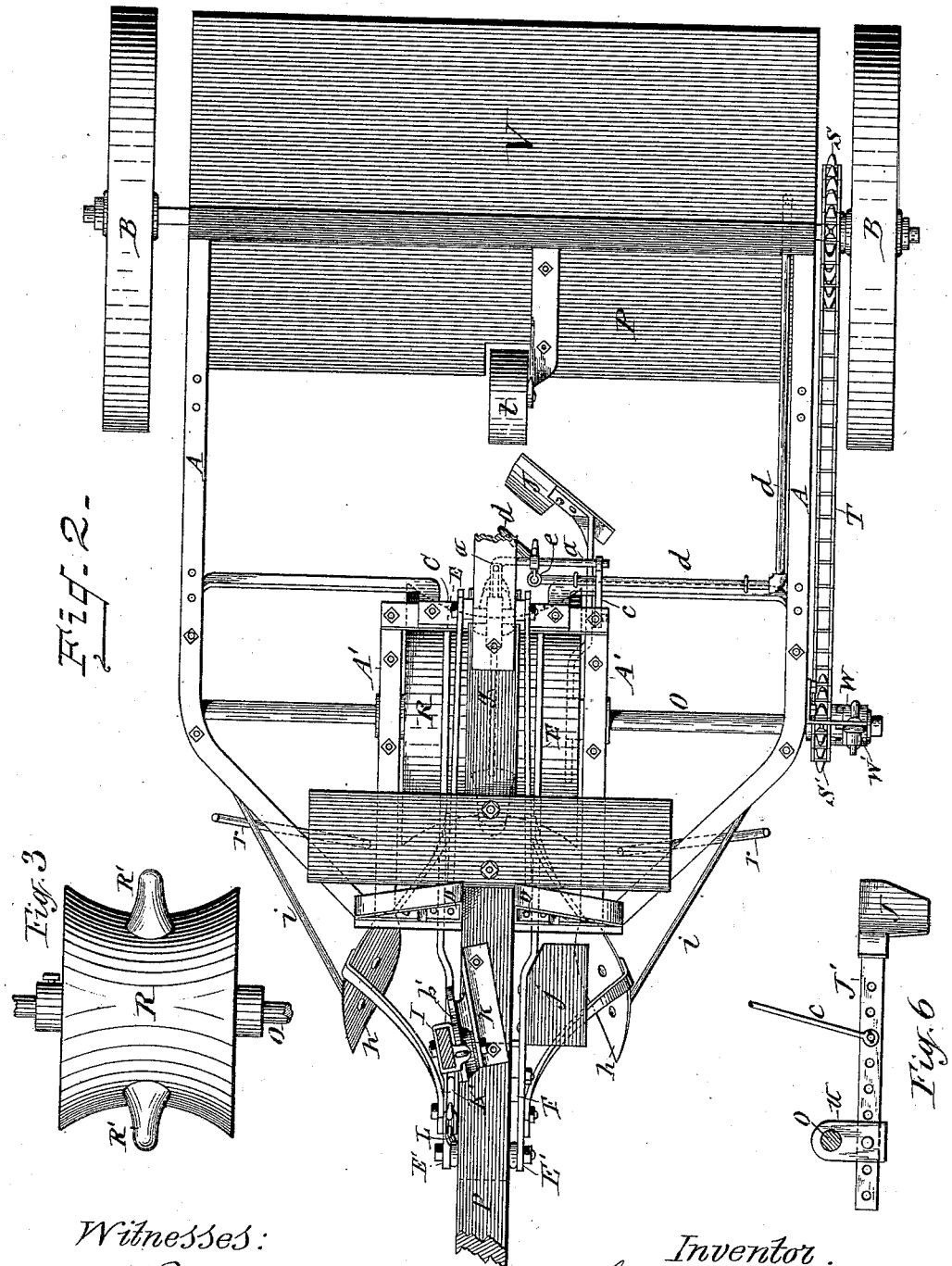

CHARLES G. ALWARD, OF MERIDIAN, NEW YORK.

TRANSPLANTING-MACHINE.

SPECIFICATION forming part of Letters Patent No. 423,200, dated March 11, 1890.

Application filed October 28, 1889. Serial No. 328,412. (No model.)

*To all whom it may concern:*

Be it known that I, CHARLES G. ALWARD, of Meridian, in the county of Cayuga, in the State of New York, have invented new and useful Improvements in Transplanting-Machines, of which the following, taken in connection with the accompanying drawings, is a full, clear, and exact description.

This invention relates to machines employed for transplanting tobacco and other small plants in rows; and it consists in a novel construction and combination of elements constituting a transplanting-machine of superior efficiency in its operation, as hereinafter fully described, and specifically set forth in the claims.

In the annexed drawings, Figure 1 is a side elevation of a transplanting-machine embodying my invention. Fig. 2 is a top plan view of the same with the driver's seat broken away to better illustrate more important features of the invention. Fig. 3 is a detached top view of the ground-opening wheel. Fig. 4 is a detail reverse view of the mechanism for automatically operating the gate of the phosphate or other fertilizer hopper. Fig. 5 is a vertical transverse section of the discharge-spout of the said hopper; and Fig. 6 is a detail view of the adjustable attachment of the scraper.

Similar letters of reference indicate corresponding parts.

A represents the main supporting-frame, which is mounted at the rear end on the axle of the carrying or traction wheels B B.

P denotes the pole or tongue, which is pivoted at its rear end to a bridge C, rigidly secured to the top of the frame A, and is sustained laterally by guides D D, attached to said frame and bearing against opposite sides of the pole.

E E are two beams, which are connected at their ends to the bridge C and at their central portions to the under side of the front end of the frame A and extend forward therefrom and terminate with perforated T-shaped heads E' for the attachment of a hook or clevis, to which the whiffletree is connected. To the front end portions of the said beams are connected adjustably longitudinally two standards F F, to the lower ends of which is pivoted the roller G, which by its contact with the ground serves to gage the depth of penetration of the ground by the ridgers $h\ h$ and ground-opener hereinafter described.

To allow the front portion of the frame A to be elevated and lowered in going to and from the field or in turning the machine about, I pivot a lever I to a bracket K, secured to the top of the pole P, and provide said lever with an arm K', which I connect with the front ends of the beams E E by a chain L, so that by swinging the said lever on its pivot the front end of the said beams, together with the front end of the frame A, can be raised or lowered, as may be desired. A dog $a'$ on the lever I, engaging a ratchet $b'$ on the bracket K, serves to retain the lever in its desired position.

In the center of the main frame A is a supplemental rectangular frame A', rigidly secured to the main frame, and from said two frames extend downward brackets N N, which are provided at their lower ends with suitable boxes or bearings, in which is journaled a shaft O. To the center of this shaft is firmly secured the ground-opening wheel R, which is thus disposed with its axis at right angles to the line of draft. Said wheel is formed with a broad and solid concaved peripheral face or tread, which is contiguous to the ground and has the concavity extending to the edges of the wheel, and from the center of said tread project radially the ground-opening teeth R' R'. The said ground-opening wheel receives rotary motion from one of the traction-wheels B by sprocket-wheels S S', rigidly attached to said traction-wheel and axle of the ground-opening wheel, and a drive-chain T, connecting said sprocket-wheels, or by any other suitable and well-known mechanism.

J represents a vertically-oscillatory scraper arranged at the rear of the ground-opening wheel and slightly to one side of the path of the teeth of said wheel. Said scraper is provided with an elongated supporting-arm J', which is provided with a series of perforations at intervals of its length, and is pivoted to a hanger U, connected to the axle O. The pivot pin or bolt passes through the hanger and through one of the perforations of the arm J', and by shifting the said connection from one perforation to another the scraper is brought a greater or less distance from the ground-opening wheel R, as may be found necessary in the operation of the machine.

The described scraper J receives its vertically-oscillatory motion by means of a rock-arm $a$, which is pivoted to the supplemental frame A' and has attached to it a lever $b$ and a pitman $c$. The lever $b$ has its free end in the path of the projections or teeth R' of the ground-opening wheel R, so that during the rotation of said wheel the contact of the teeth thereof with the lever will impart an oscillatory movement to the same and to the rock-arm $a$. The pitman $c$, which partakes of this movement, is provided at its lower end with an eye, and by a bolt or pin passing through said eye and through one of the perforations of the scraper-arm J' said parts are connected, and thus the scraper receives its oscillatory motion. By shifting the said connection from one perforation to another on the scraper-arm the thrust of the latter can be varied at pleasure.

V represents a water-tank mounted on the frame A in any suitable position, and $d$ is the discharge-pipe leading from said tank to the path of the teeth R' or projections of the ground-opening wheel R at the rear of the latter, said pipe being provided with any suitable and well-known species of normally-closed or self-closing valve $e$, which in this case is shown as having a laterally-extended handle $e'$ for opening the valve.

To the before-described rock-arm $a$ is attached a lever or push-bar $f$, the free end of which is in such a position as to cause it to depress the valve-handle $e'$ when said push-bar is depressed by the rock-arm $a$, and thus open the valve. To depress the push-bar as aforesaid, I connect to the rock-arm $a$ another lever $g$, which is extended over the top of the ground-opening wheel R, and toward the front of the same and in the path of the projections R', so that during the rotation of said wheel the projections thereof will lift the free end of the lever, and thereby actuate the rock-arm, so as to cause it to depress the push-bar and thus open the valve $e$ automatically and at regular intervals during the rotation of the ground-opening wheel R.

In order to allow the water to be shut off entirely when desired, I form the lever $g$ with an offset and pivot said lever to the rock-arm, so that by turning the lever on its pivot the free end thereof can be thrown out of the path of the projections R' R' R' of the wheel R.

W represents a clutch-collar, which slides on the shaft of the ground-opening wheel R, and is connected therewith by a feather and groove in the usual and well-known manner, and is adapted to interlock with and release a clutch-face on the sprocket-wheel S' and throw the said shaft in and out of gear, as may be desired. A lever W' is pivoted to the frame A and connected at one end with the clutch-collar W, to allow the attendant of the machine to shift the said clutch-collar for the aforesaid purpose.

In front of the ground-opening wheel R, at opposite sides of the center thereof, are two ridgers $h\ h$, of the form of plowshares or moldboard, which are convergent downward and rearward, and are secured to standards $h'\ h'$, connected vertically adjustably to the beams E E, hereinbefore described, and are further sustained against lateral strain by braces $i\ i$, extending from the said ridgers rearward and outward and secured to the frame A.

J denotes a hopper for phosphates or other fertilizer, which hopper is arranged with its discharge-spout in front of and central in the line of the travel of the ground-opening wheel and preferably between the two ridgers $h\ h$. The discharge-spout of said hopper is provided with a suitable gate $l$, which may be of the form of a longitudinally-grooved roller arranged inside of said spout and pivoted thereto, as represented in Fig. 5 of the drawings. To one end of the shaft of the roller $l$, at the exterior of the hopper, is rigidly attached a ratchet-wheel $m$, and to the exterior of the hopper is connected a suitable tripper for operating the gate or roller $l$, said tripper being represented in the form of a pawl $n$, pivoted to the suitable support on the exterior of the hopper. A lever or arm $n'$ is extended from the said pawl rearward, and has its free end in the path of the projections R' R' R' of the wheel R, so as to be depressed thereby at regular intervals of time during the rotation of the said wheel. A spring $o$, connected at one end to the rear end of the pawl or to the arm $n'$ and to the beam E, supports said arm and holds the gate $l$ normally closed.

P denotes the seat for the person or persons setting the plants, and $r$ is the foot-rest for the same.

The operation of my transplanting-machine is as follows: In drawing the machine over the field in the line in which the plants are to be set, the ridgers $h\ h$ dig up the earth at opposite sides of the aforesaid line and cast the earth toward said line and in the path of the ground-opening wheel R. Simultaneously with the operation of the ridgers the gate $l$ of the hopper is opened intermittently and allows the phosphate or fertilizer to drop at the same distances apart on the ground as the distances between two adjacent teeth or projections R' R' of the wheel R, which, in passing over the ridge of ground, pierce the same at the same points where the fertilizer is deposited. The teeth R' produce in the ridge holes of sufficient diameter and depth to permit the plants to be set therein. The setting of the plants is effected by the person or persons riding on the seat M. Simultaneously with the setting of the plants the lever $g$, by its contact with one of the teeth R', depresses the push-bar $f$, and thereby opens the valve $l$ to allow water to flow to the place where the plant is set, the valve being immediately reclosed by the release of the lever $g$ from the tooth R' moving from under it. Simultaneously with the depression of the push-bar $f$ the pitman $c$ depresses the scraper J, which deposits the earth around the plant; and back of said scraper is a roller $t$, which passes by the side of the plant and over the earth deposited by the scraper and presses said earth around the plant, similar to the rollers employed in other transplanting-machines.

Having described my invention, what I claim as new, and desire to secure by Letters Patent, is—

1. A transplanting-machine comprising a frame mounted on carrying-wheels, a ground-opener connected to said frame, a fertilizer-hopper having its discharge-spout in the line of travel of the ground-opener, and a water-tank having a discharge-pipe leading to the path of the ground-opener, as set forth and shown.

2. A transplanting-machine comprising a frame mounted on carrying-wheels, a ground-opener connected to said frame, ridgers in front of the ground-opener, a fertilizer-hopper having its discharge-spout in the line of travel of the ground-opener, and a water-tank having a discharge-pipe leading to the path of the ground-opener, substantially as described and shown.

3. In combination with the traction-wheels, a shaft parallel with the axle of said wheels, a ground-opening wheel on said shaft central between the lines of travel of the traction-wheels, mechanism transmitting motion from the traction-wheels to the shaft of the ground-opening wheel, and ridgers in front of said ground-opening wheel, as set forth.

4. In a transplanting-machine, the combination, with the ground-opener, of a vertically-oscillatory scraper arranged back of the ground-opener and oscillated by mechanism connected with the machine, as and for the purpose set forth.

5. In combination with the ground-opening wheel provided with radial projections, a vertically-oscillatory scraper and a lever in the path of the said projections and by contact therewith lifting the scraper, substantially as set forth.

6. In combination with the supporting-frame and the ground-opening wheel provided with radial projections, a vertically-oscillatory scraper, levers in the path of the said projections and on different portions of the periphery of the ground-opening wheel, and said levers alternately lifting and depressing the scraper by contact of the levers with the projections of the ground-opening wheel, substantially as set forth and shown.

7. In a transplanting-machine, the combination, with the traction-wheels and frame, of a shaft parallel with the axis of said wheels, a ground-opening wheel on said shaft, mechanism transmitting positive motion from the traction-wheels to the shaft of the ground-opening wheel, and a vertically-oscillatory scraper back of the ground-opening wheel and actuated by mechanism connected with the machine, as set forth.

8. In a transplanting-machine, the combination, with the traction-wheels and frame, of a shaft parallel with the axis of said wheels, a ground-opening wheel on said shaft having radial projections on its periphery, sprocket-wheels rigidly attached to one of said traction-wheels and to the shaft of the ground-opening wheel, a drive-chain connecting said sprocket-wheels, a water-tank having its discharge-pipe leading to the path of the ground-opening wheel, a valve connected to said pipe, and a lever actuated by the aforesaid projections of the ground-opening wheel and adapted to open the aforesaid valve, substantially as described and shown.

9. In combination with the ground-opening wheel, the scraper having its supporting-arm provided with a series of perforations at intervals of its length, a hanger connected to the axle of the aforesaid wheel and to the scraper-arm by a pin passing through one of the perforations of the latter and through the hanger, a rock-arm actuated by the ground-opening wheel, and a pitman connected at one end to said rock-arm and provided at the opposite end with an eye, and a coupling pin or bolt passing through said eye and through one of the perforations of the scraper-arm, substantially as described and shown.

10. In combination with the supporting-frame, a ground-opening wheel having projections on its periphery, and the water-tank having its discharge-pipe leading to the path of the ground-opening wheel and provided with a valve, the rock-arm $a$, push-bar $f$, attached to said rock-arm and adapted to open the aforesaid valve, the lever $g$, pivoted to the rock-arm and formed with an offset adapted to throw said lever in and out of the path of the projections of the ground-opening wheel by turning the lever in the aforesaid rock-arm, substantially as described and shown.

In testimony whereof I have hereunto signed my name this 25th day of October, 1889.

CHARLES G. ALWARD. [L. S.]

Witnesses:
C. L. BENDIXON,
MARK W. DEWEY.